United States Patent
Wolfe

(10) Patent No.: US 11,433,549 B2
(45) Date of Patent: Sep. 6, 2022

(54) PIZZA TRANSFER TOOL

(71) Applicant: Wolfe Electric, Inc., Wichita, KS (US)

(72) Inventor: Ronald D. Wolfe, Wichita, KS (US)

(73) Assignee: WOLFE ELECTRIC, INC., Wichita, KS (US)

(*) Notice: Subject to any disclaimer, the term of this patent is extended or adjusted under 35 U.S.C. 154(b) by 5 days.

(21) Appl. No.: 17/110,935

(22) Filed: Dec. 3, 2020

(65) Prior Publication Data

US 2021/0086369 A1   Mar. 25, 2021

(51) Int. Cl.
| | |
|---|---|
| *B25J 11/00* | (2006.01) |
| *B25J 9/10* | (2006.01) |
| *B25J 15/00* | (2006.01) |
| *A21C 9/08* | (2006.01) |
| *B25J 9/12* | (2006.01) |

(52) U.S. Cl.
CPC ............ *B25J 11/0045* (2013.01); *A21C 9/08* (2013.01); *B25J 9/1065* (2013.01); *B25J 15/0028* (2013.01); *B25J 15/0033* (2013.01); *B25J 9/123* (2013.01)

(58) Field of Classification Search
CPC . A21C 9/08; B25J 9/1065; B25J 9/123; B25J 11/0045; B25J 15/0028; B25J 15/0033
See application file for complete search history.

(56) References Cited

U.S. PATENT DOCUMENTS

| | | | |
|---|---|---|---|
| 6,214,399 B1 | 4/2001 | Garbo | |
| 6,284,301 B1 | 9/2001 | Garbo | |
| 6,550,632 B2 | 4/2003 | Gubbini et al. | |
| 8,425,959 B2 | 4/2013 | Westberg | |

(Continued)

FOREIGN PATENT DOCUMENTS

| | | |
|---|---|---|
| CN | 105905791 | 8/2016 |
| EP | 2743041 | 6/2014 |

(Continued)

OTHER PUBLICATIONS

"Conquering the Pizza Industry With Her Robot Army"; Samara Lynn; 2016 https://www.blackenterprise.com/conquering-zume-pizza-industry-robot/.

(Continued)

*Primary Examiner* — Saul Rodriguez
*Assistant Examiner* — Brendan P Tighe
(74) *Attorney, Agent, or Firm* — Kenneth H. Jack; Davis & Jack, L.L.C.

(57) ABSTRACT

A pizza transfer tool incorporating a vertical shaft; an upper member mounted to the vertical shaft for upward and downward motions; a lower member mounted to the vertical shaft for upward and downward motions; a circumferential array of upper pivot arms having proximal ends pivotally mounted to the upper member; a circumferential array of lower pivot arms having proximal ends pivotally mounted to the lower member; a circumferential array of linking members having inner ends and outer ends, wherein each outer end is pivotally mounted to a distal end of one of the upper pivot arms, and wherein each inner end is pivotally mounted to a distal end of one of the lower pivot arms; and a circumferential array of spatulas attached to the linking member's inner ends.

8 Claims, 4 Drawing Sheets

(56) References Cited

U.S. PATENT DOCUMENTS

| | | | |
|---|---|---|---|
| 8,710,408 B2 | | 4/2014 | Khatchadourian et al. |
| 9,974,314 B2 | | 5/2018 | FritzJung |
| 10,556,338 B1 | | 2/2020 | Marchese et al. |
| 10,759,062 B2 | * | 9/2020 | Ma .......................... B25J 19/04 |
| 2012/0263847 A1 | | 10/2012 | Poli et al. |
| 2015/0239713 A1 | * | 8/2015 | Ward ...................... B66C 3/005 |
| | | | 294/198 |
| 2019/0037859 A1 | | 2/2019 | Hamon et al. |
| 2019/0176346 A1 | | 6/2019 | Ma et al. |

FOREIGN PATENT DOCUMENTS

| | | | |
|---|---|---|---|
| EP | 2845698 | | 3/2015 |
| JP | 2000289970 | | 10/2000 |
| JP | 2000289970 A | * | 10/2000 |
| JP | 2010036328 | | 2/2010 |
| WO | WO2011106475 | | 9/2011 |
| WO | WO2018122323 | | 7/2018 |
| WO | WO2019079345 | | 4/2019 |

OTHER PUBLICATIONS

"Food Industry Use of Robotics to Grow Sharply"; Phil Britt; 2017 https://www.roboticsbusinessreview.com/manufacturing/food-industry-use-robotics-grow-sharply/.

* cited by examiner

PIZZA TRANSFER TOOL

FIELD OF THE INVENTION

This invention relates to machines and apparatus which are adapted for commercial cooking and handling of pizzas. More particularly, this invention relates to such machinery and apparatus which are specially adapted for engaging a pizza as it emerges from an automated commercial oven, and for transporting the pizza to a next processing location.

BACKGROUND OF THE INVENTION

Pizzas which are baked in a restaurant's conveyor or tunnel pizza oven are often contained and carried within a circular baking pan. Such pans commonly include a circular retainer wall at its periphery. Such pan walls cause difficulties and create mechanical challenges in designing tools which are capable of automatically engaging and lifting a pizza from such pan. A common motion of a spatula used to lift and transport a pizza extends the spatula's lifting blade horizontally toward the edge of the pizza, such motion being directed radially inwardly from the pizza's periphery. However, the presence of a pizza pan's peripheral retaining wall undesirably constitutes a mechanical obstruction to such common lifting use of a spatula.

The instant inventive pizza transfer tool provides specially linked and interconnected circumferential array of pivoting arms and spatulas which are capable of engaging a pizza within a peripherally walled pizza pan, and is capable of lifting and carrying the pizza out of such pan.

BRIEF SUMMARY OF THE INVENTION

A first structural component of the instant inventive pizza transfer tool comprises a vertical shaft which is oriented along a vertical axis. In a suitable embodiment, the vertical shaft is smooth walled, having a circular or square horizontal cross-sectional shape. The vertical shaft may serve as a vertical slide guide or track which supports vertically slidable sleeves. Alternatively, the vertical shaft may comprise a telescoping quill and stem combination.

A further structural component of the instant inventive pizza transfer tool comprises an upper vertically movable member which may comprise an upper slide sleeve mounted to the vertical shaft for alternative upward and downward motions therealong. Alternatively, where the vertical shaft comprises a telescoping quill and stem combination, the upper vertically moveable member may comprise an upper component of such combination. Depending upon the orientation of the quill and stem combination, the upper vertically moveable member may comprise either such combination's quill component or such combination's stem combination.

A further structural component of the instant inventive pizza transfer tool comprises a lower member which, similarly with the above described upper slide sleeve, may suitably comprise a lower slide sleeve which is mounted for vertically reciprocating sliding movements along the lower end of the vertical shaft.

Alternatively, the lower member may comprise a lower component of the alternatively provided telescoping quill and stem configured vertical shaft. Where a quill and stem combination is provided, the vertically moveable lower member is preferably driven by a linear motion actuator which is capable of moving the lower member along the vertical axis a rate which differs from the upper member's vertical movements.

Where the upper and lower vertically moveable members comprise slide sleeves which are independently moveable along the vertical shaft, such members may be configured substantially identically with each other. The alternatively provided sleeves may instead of sliding at their interfaces with the vertical shaft, present low friction roller bearings, such alternatively configured sleeves constituting roller bearing sleeves. Where roller bearing sleeves are provided, the vertical shaft is preferably square in order to present flat vertically extending roller track surfaces.

Further structural components of the instant inventive pizza transfer tool comprise an upper circumferential array of pivot arms. In a suitable embodiment, each arm among such array has a radially inner and proximal end which is pivotally or hingedly mounted to the upper vertically moveable member. Such an array of upper arms may consist of four arms evenly circumferentially spaced at approximate 90° angle increments. Alternatively, three of such arms may be provided with 120° spacing. Further alternatively, five or six of such arms may be provided respectively arranged with 72° or 60° spacing. Other numbers of such circumferentially spaced arms are considered to fall within the scope of the invention.

A further structural component of the instant inventive pizza transfer tool comprises a second and underlying circumferential array of lower pivot arms. Each arm among such lower pivot arm array preferably has a radially inner or proximal end which is pivotally or hingedly mounted to the vertically lower member.

A further structural component of the instant inventive pizza transfer tool comprises a matching circumferential array of linking members. In a preferred embodiment, each linking member has a radially inner end and a radially outer end, the radially outer end of each linking member being pivotally mounted to the radially outer and distal end of one of the upper pivot arms, and the radially inner end of said each linking member being pivotally mounted to a radially outer and distal end of an immediately underlying lower pivot arm.

The pivotally attached circumferential array of linking members advantageously complete within the inventive transfer tool a circumferential array of pivoting four bar linkages. Each of the tool's four bar linkage commonly includes the portion of the vertical shaft which spans between the pivoting attachments of the proximal ends of the upper and lower arms as the linkages' fourth bar. Such fourth bar is radially central, and such central bar may constitute the only bar of the four bar linkages whose effective length is alternatively extendable and retractable. The instant invention's circumferential array of four bar linkages distally extends the array of linking members, and is capable of imparting multiple axis rotary motion upon the linking members.

A further structural component of the instant inventive pizza transfer tool comprises a matching circumferential array of spatula heads. In the preferred embodiment, such spatula head array is fixedly attached to and extends downwardly and radially inwardly from the radially inner ends of the linking members. The linking members' support of the spatula heads is analogous to the function of a common spatula handle.

Vertical motion actuators, suitably jack screw actuators, are preferably operatively connected to the upper and lower members for selectively moving such members in vertically upward or downward directions along vertical shaft's vertical axis. Upon selective actuations of the vertical motion actuators, proximal ends of the tool's upper and lower circumferential arrays of pivot arms are simultaneously angularly moved with respect to the vertical axis of the vertical shaft. Such angular motions of the upper and lower pivot arms advantageously translate into simultaneous pivoting and rotating motions of the distally attached linking members. Such motions automatically move the attached circumferential array of spatula heads about multiple rotation axes. Such motions of the linking members advantageously guide the blades of the spatula heads along paths which initially substantially follow and vertically traverse the inner surface of a pizza pan's peripheral wall. Through rotating motions guided by their attached upper and lower pivot arms, the linking members may subsequently extend their spatula blades horizontally beneath the peripheral edge of a pizza within the pan.

Thereafter, a provided overhead mechanism which carries the entirety of the transfer tool may carry the transfer tool and the engaged pizza to an offloading location such as a pizza cutting and boxing station.

Accordingly, objects of the instant invention include the provision of a pizza transfer tool which incorporates structures as described above, and which arranges those structures in manners described above for the performance of beneficial functions, as described above.

Other and further objects, benefits, and advantages of the instant invention will become known to those skilled in the art upon review of the Detailed Description which follows, and upon review of the appended drawings.

DETAILED DESCRIPTION OF THE PIZZA TRANSFER TOOL

Figure 1:
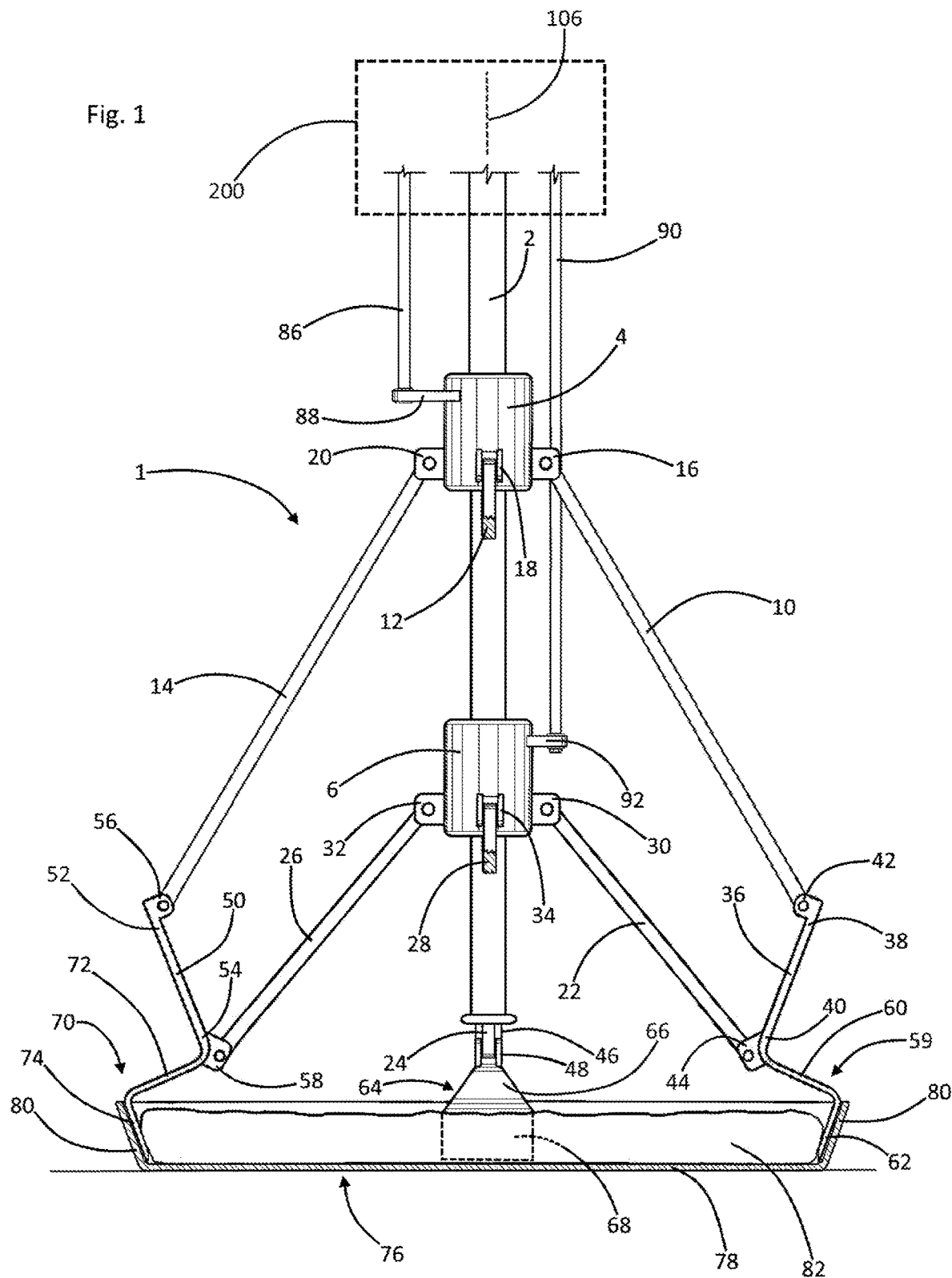
FIG. 1 is a side view of a suitable embodiment of the instant inventive pizza transfer tool, the view showing an initial engagement with a pizza contained within a pizza pan.

Referring now to the drawings and in particular to Drawing FIG. 1, a suitable embodiment of the instant inventive pizza transfer tool is referred to generally by Reference Arrow 1. The transfer tool 1 may suitably comprise a vertical shaft 2 which aligns with a vertical axis 106. The upper end of the vertical shaft 2 may suitably suspend from and may be carried by an automated overhead carriage mechanism (not depicted within views) which is capable of moving all components of the transfer tool 1 including the vertical shaft 2 and, referring further to FIG. 3, pizza 82 which constitutes a work piece upon which the tool operates. In a preferred embodiment, the transfer tool 1 is capable of carrying the pizza 82 to a cooked pizza processing location or station such as a pizza cutting and boxing station (not depicted within views).

A sleeve configured upper member 4 may suitably be provided, such member being mounted upon the vertical shaft 2 in a manner which facilitates reciprocating upward and downward motions of the upper member 4 along the vertical shaft 2. The upper member 4 is suitably configured to move slidably along the vertical shaft 2, utilizing such shaft as a slide guide. For purposes of friction reduction and smooth operation, the interface at the outer surface of shaft 2 and at the inner wall of the sleeve 4 may present roller bearings or wheels (not depicted within views). Where such bearings are incorporated, the sleeve 4 constitutes a roller bearing sleeve. The depicted combination of the upper member/slide sleeve 4 and vertical shaft 2 is intended as being representative of other commonly known means for mechanically associating a movable member with a vertical shaft or column for alternate upward and downward movements of the sleeve therealong.

Figure 2:
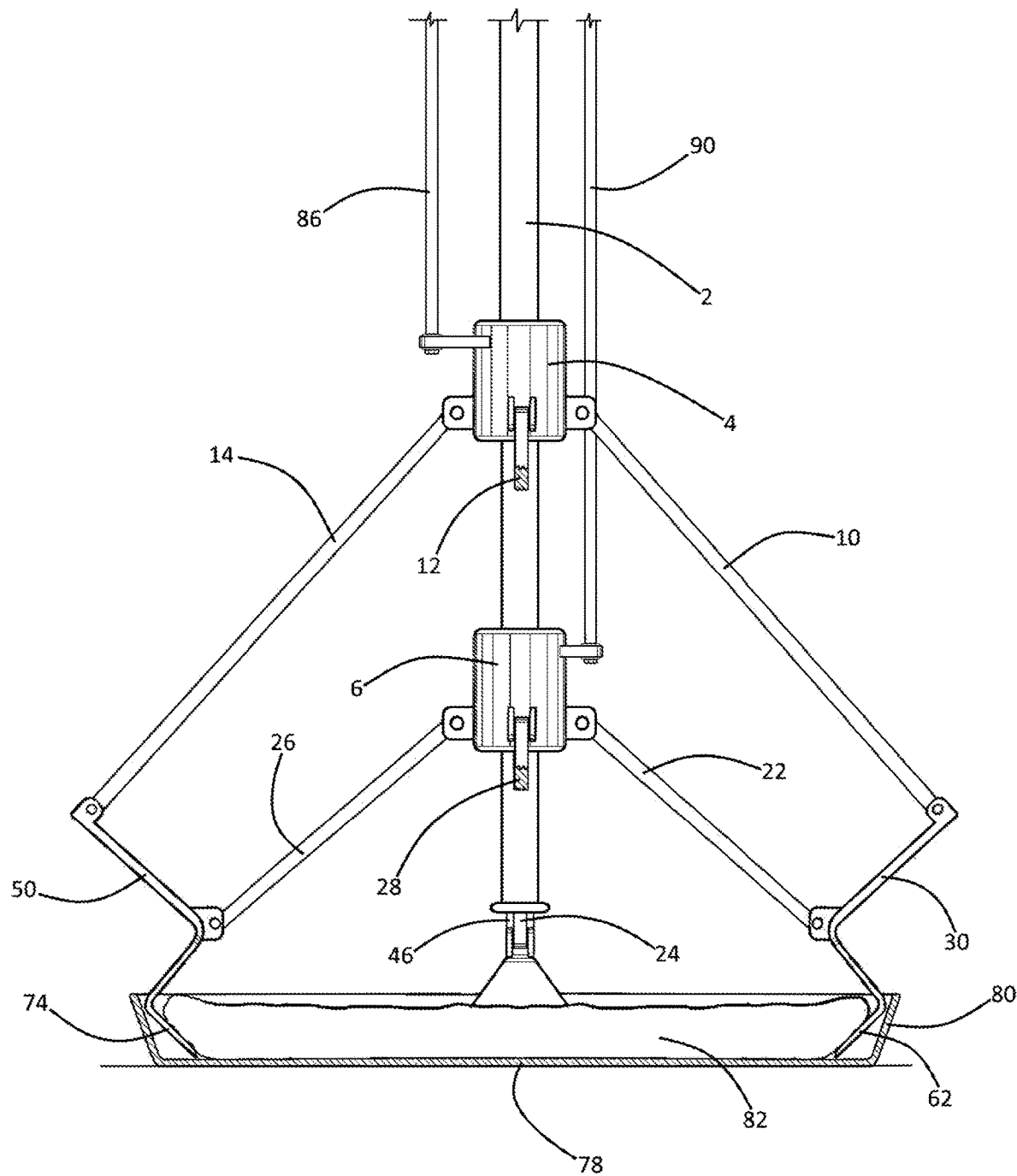
FIG. 2 redepicts the structure of FIG. 1, the view of FIG. 2 showing the tool in further engagement with the pizza.
Figure 3:
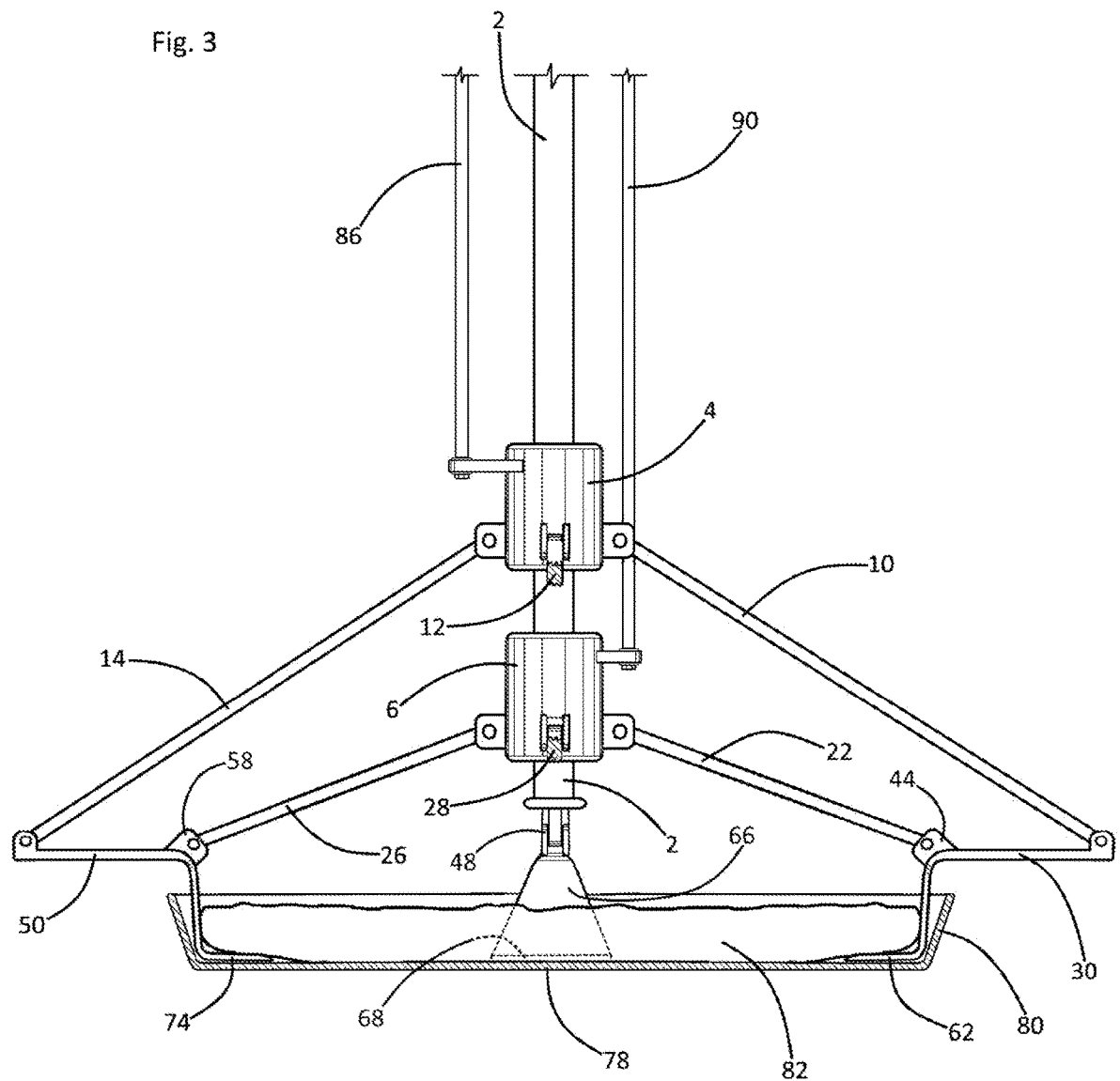
FIG. 3 redepicts the structure of FIGS. 1 and 2, the view showing final engagement of the tool with the pizza.
Figure 4:
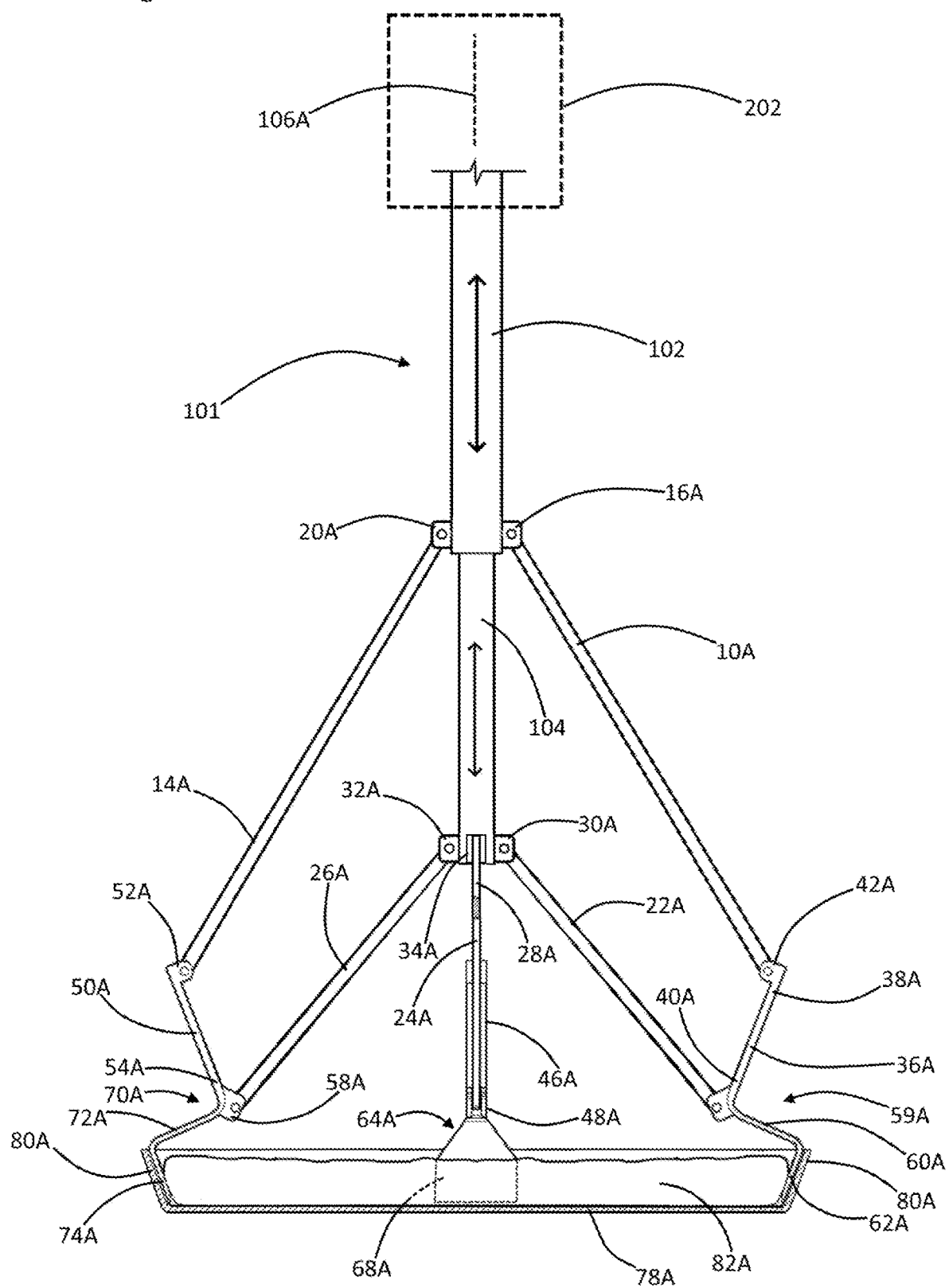
FIG. 4 presents an alternate configuration of structures depicted in FIGS. 1-3.

Looking further simultaneously to FIG. 4, all structures appearing in FIG. 4 which are identified by a reference numeral having a suffix "A" are configured similarly with similarly numbered structures appearing in FIGS. 1-3. In the FIG. 4 structural alternative, FIG. 1's vertical shaft 2 is replaced by a vertically aligned telescoping quill and stem combination 101. As drawn, such combination's upper quill member 102 constitutes the tool's upper member in replacement of the upper slide sleeve 4 of the FIGS. 1-3 structural alternative. Correspondingly, the telescopingly extendable and retractable stem 104 of the quill and shaft combination 101 constitutes a substitute for the lower slide sleeve 6 of the FIGS. 1-3 structure. The alternative quill and stem combination 101 of FIG. 4 is intended as being representative of an inverted quill and stem combination (not depicted in views) wherein the stem is alternatively upwardly oriented, and wherein the quill upwardly and downwardly telescopes with respect to the lower end of the stem.

Referring again to FIG. 1, a further structural component of the instant inventive tool 1 comprises the lower member 6 (or in the FIG. 4 structural alternative, lower member stem 104), the lower member being mounted upon the vertical shaft 2 so that attached pivot mounts 30, 32, and 34 underlie the upper member. In a preferred embodiment, the lower member 6 (or stem 104 as the case may be) is capable of vertical motions at different speeds with respect to the motion of the upper member 4 or 102. Where the lower member comprises a sleeve such as sleeve 6, such lower member may suitably be composed and configured similarly with the upper member 4.

Referring further to FIG. 1, the instant inventive tool 1 further comprises a plurality of pivoting upper arms which are represented by the three arms 10, 12, and 14 which are visible in the view of FIG. 1. In FIG. 1's view, upper arm 12 extends forwardly (toward a viewer of FIG. 1) from the vertical shaft 2, such arm being cutaway to expose underlying structures. The upper arms of the tool 1 are, as depicted, suitably four in number, such arms extending in a circumferential array spaced at substantially equal 90° angle increments. Accordingly, in the view of FIG. 1, the tool's fourth upper arm extends away from the viewer and such fourth arm is not shown within the view. The radially inner and proximal end of each upper arm is preferably hingedly or pivotally attached to the upper member 4 by a hinge which is exemplified by pivot joints or mounts 16, 18, and 20.

An underlying circumferential array of pivot arms 22, 24, 26, and 28 is similarly pivotally attached to the lower member 6 by hinges which are exemplified by pivot joints 30, 32, and 34.

In order to complete a circumferential array of four bar linkages, a matching circumferential series of linking members, exemplified by bar or shaft configured members 36, 46, and 50 are provided. Such linking members preferably span between and pivotally interconnect the distal ends of the upper and lower circumferential arrays of pivot arms 10,12, 14 and 22,24,26,28.

Referring in particular to linking member 36, such member's pivoting connections include a hinge 42 which attaches such member's radially outer end 38 to the distal end of upper arm 10. A second hinge 44 further attaches the radially inner end 40 of linking member 36 to the distal end of lower arm 22. The transfer tool's other linking members are similarly mounted. For example, the radially inner end 40 of linking member 36 is pivotally mounted by hinge 44 to the distal end of lower pivot arm 22, while the radially outer end 38 of such member is attached by hinge 42 to the distal end of upper pivot arm 10. As a further example, the radially inner end 54 of linking member 50 is pivotally mounted by hinge 58 to the distal end of lower pivot arm 26, while the radially outer end 52 of such member is attached by hinge 56 to the distal end of upper pivot arm 14. Linking member 46 is similarly attached by hinges, including hinge 48, which connects with lower pivot arm 24.

A matching circumferential array or series of spatula heads (exemplified by spatula heads 58, 64, and 70) is preferably fixedly attached to or formed wholly with the radially inner ends of the linking members. Such spatula heads 58, 64, and 70 suitably respectively comprise extension sections 60, 66, and 72, and pizza lifting blades or plates 62, 68, and 74. Arcuately directed pivoting motions of the spatula blades 62, 68, and 74 correspond with vertical and rotating motions of the linking members 36, 46, and 50. The vertical motions of the sleeves 4 and 6 are translated into such linking member motions via their pivotally attached upper and lower circumferential arrays of pivot arms 10,12, 14 and 22,24,26,28.

Means for vertically driving and moving the tool's upper and lower members are necessarily provided. Where slide sleeve configured upper and lower members 4 and 6 are provided, as in the FIGS. 1-3 structural alternative, such means may comprise vertically extending actuator bars 86 and 90 which are respectively rigidly mounted to the upper and lower members 4 and 6 by mounting arms 88 and 92.

Overhead linear motion actuators represented by dashed line box 200 operatively associate with and selectively reciprocatingly move actuator bars 86 and 90 and/or shaft 2. In a suitable embodiment, the overhead motion actuators 200 incorporate the electric motor driven jack screws or ball screws (not depicted within views) which are capable of translating rotary motor power to selective vertical upward and downward motions of the actuator bars 86 and 90 and/or shaft 2. In a preferred embodiment, such motors comprise encoder motors whose rotations are accurately controlled via computer processor which correlates rotation and counter-rotation counts with selected spans and rates of vertical movement of the actuator bars 86 and 90 and/or shaft 2.

In the FIG. 4 structural alternative, similarly functioning linear motion actuators represented by dashed line box 202 may engage and vertically move the upper ends of both the tubular quill component 102 and its internally slidably mounted stem component 104. Other types of linear motion actuators such as pneumatic and hydraulic cylinders actuators and rack and pinion drive actuators (not depicted within views) may be suitably alternatively utilized for selectively upwardly and downwardly moving the tool's vertically moveable components.

In operation of the instant inventive pizza transfer tool 1, the sleeves and the arrays of pivot arms may be initially configured as indicated in FIG. 1 with upper and lower members 4 and 6 selectively upwardly positioned via operation of linear motion actuators 200. Contemporaneously, the entire tool 1 may be positioned horizontally so that the extreme distal or radially inner ends of spatula blades 62,68,74 directly overlie the peripheral wall 80 of a pizza pan 76. Upon a subsequent operation of the linear motion actuators 200 to lower the tool 1, the spatulas' blades 62,68,74 slidably insert between the inner surface of the peripheral wall 80 and the outer peripheral surface of the contained pizza 82.

Further selective operation of linear motion actuators 200, preferably via computer processor control of encoder motors, slidably moves the upper and lower members 4 and 6 downwardly at variable rates from their upper FIG. 1 positions toward intermediate underlying positions indicated in FIG. 2. The downward motions of members 4 and 6 are translated to simultaneous downward and rotating motions of linking members 36,46,50 via the circumferential arrays of pivot arms 10,12,14 and 22,24,26,28. Such motions translate to the spatulas 58, 64, and 70, moving them from their FIG. 1 positions, where they peripherally surround pizza 82, to their intermediate FIG. 2 positions. During the spatulas' transitions from their FIG. 1 positions to their FIG. 2 positions, the radially inner edges of the spatula blades 62,68,74 slide radially inwardly beneath the peripheral edge of the pizza 82.

The downward motions of the upper and lower members 4 and 6 preferably continue until the spatula blades 62,68,74 completely horizontally underlie the peripheral edge of the pizza 82. Thereafter, the actuators 200 may be operated to raise the tool 1 and the pizza 82 upwardly away from the floor 78 of the pizza pan 76.

During the lifting of the pizza 82 by the spatula blades (including blades 80, 74, and 68), torque moments about joints 44, 58, and 48 are applied. The circumferential array of four bar linkages advantageously applies roughly equal counter-torque moments about those joints via the weights of the linking members which serve as counter-torque lever arms, via the weights of upper pivot arms which downwardly bear upon the radially outer ends of the linking members, and via friction within the four bar linkages' joints. Through its provision of such counter-torque forces, the circumferential array of four bar linkages is advantageously capable of maintaining the spatula blades 62, 68, and 74 in their horizontal orientations during lifting of the pizza 82.

Thereafter, the tool 1 and the spatula engaged pizza 82 may be carried horizontally to, for example, a pizza cutting and boxing station (not depicted within views).

The alternatively configured tool 101 of FIG. 4 operates similarly with the tool 1 of FIGS. 1-3, with actuators 202 selectively moving the quill 102 and the stem 104 upwardly and downwardly, for substantially identical actuations of four bar linkages in their control of the movements of spatulas 62A, 68A, 74A.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:
1. A pizza transfer tool comprising:
 (a) a vertical shaft aligned with a vertical axis;

(b) an upper member mounted to the vertical shaft for alternative upward and downward motions along the vertical axis;

(c) a lower member mounted to the vertical shaft for motions with respect to the upper member, said motions being along the vertical axis;

(d) a plurality of upper arms, each upper arm among the plurality of upper arms having a proximal end pivotally mounted to the upper member;

(e) a plurality of lower arms, each lower arm among the plurality of lower arms having a proximal end pivotally mounted to the lower member;

(f) a plurality of linking members, each linking member among the plurality of linking members having a radially outer end and having a radially inner end, wherein the radially outer end of said each linking member is pivotally mounted to a distal end of one of the upper arms, and wherein the radially inner end of said each linking member is pivotally mounted to a distal end of one of the lower pivot arms; and (g) a plurality of spatulas, each spatula among the plurality of spatulas being fixedly attached to the radially inner end of one of the linking members.

2. The pizza transfer tool of claim 1 wherein the upper member comprises a reciprocatingly moveable member selected from the group consisting of slide sleeves, roller bearing sleeves, quill and stem combination quill components, and quill and stem combination stem components.

3. The pizza transfer tool of claim 2 wherein the upper and lower members respectively comprise upper and lower arrays of hinge mounts.

4. The pizza transfer tool of claim 3 comprising linear motion actuators connected operatively to the upper and lower members.

5. The pizza transfer tool of claim 1 wherein the upper and lower arms are circumferentially spaced from each other at angles selected from the group consisting of approximate 120° angles, approximate 90° angles, approximate 72° angles, and approximate 60° angles.

6. The pizza transfer tool of claim 5 wherein each lower arm vertically underlies one of the upper arms.

7. The pizza transfer tool of claim 1 wherein each spatula among the plurality of spatulas comprises a downward extension section and a blade section.

8. The pizza transfer tool of claim 2 comprising a circumferential array of four bar linkages, each four bar linkage among said array of linkages comprising the vertical shaft, one of the upper arms, one of the lower arms, and one of the linking members.

* * * * *